United States Patent
Hudman et al.

(10) Patent No.: US 12,197,074 B2
(45) Date of Patent: Jan. 14, 2025

(54) DISPLAY BACKLIGHT WITH LIGHT EXPANDER STRUCTURES

(71) Applicant: Valve Corporation, Bellevue, WA (US)

(72) Inventors: Joshua Mark Hudman, Issaquah, WA (US); Kameron Wade Rausch, Sammamish, WA (US); Douglas Vanderwel, Kent, WA (US)

(73) Assignee: Valve Corporation, Bellevue, WA (US)

( * ) Notice: Subject to any disclaimer, the term of this patent is extended or adjusted under 35 U.S.C. 154(b) by 18 days.

(21) Appl. No.: 17/668,155

(22) Filed: Feb. 9, 2022

(65) Prior Publication Data
US 2022/0269133 A1    Aug. 25, 2022

Related U.S. Application Data (60) Provisional application No. 63/147,997, filed on Feb. 10, 2021.

(51) Int. Cl.
*G02F 1/1335* (2006.01)
*G02F 1/13363* (2006.01)

(52) U.S. Cl.
CPC .. *G02F 1/133607* (2021.01); *G02F 1/133536* (2013.01); *G02F 1/133548* (2021.01); *G02F 1/133638* (2021.01)

(58) Field of Classification Search
None
See application file for complete search history.

(56) References Cited

U.S. PATENT DOCUMENTS

| | | |
|---|---|---|
| 2002/0172031 A1 | 11/2002 | Masuda |
| 2006/0098205 A1* | 5/2006 | Townley-Smith .......... G01B 9/02007 356/487 |
| 2007/0171328 A1 | 7/2007 | Freeman et al. |
| 2008/0247150 A1 | 10/2008 | Itoh et al. |
| 2009/0052047 A1 | 2/2009 | Amitai |
| 2010/0231826 A1 | 9/2010 | Itou et al. |

(Continued)

FOREIGN PATENT DOCUMENTS

| | | | |
|---|---|---|---|
| CN | 103852897 A | * 6/2014 | |
| EP | 3374691 B1 | * 3/2023 | ......... G02B 27/0081 |
| WO | 2019/092412 A1 | 5/2019 | |

OTHER PUBLICATIONS

International Search Report and Written Opinion, mailed May 24, 2022, for International Patent Application No. PCT/US2022/015840. (11 pages).

(Continued)

*Primary Examiner* — Phu Vu
(74) *Attorney, Agent, or Firm* — Seed IP Law Group LLP (57) ABSTRACT

Methods and systems relating generally to information displays, and more particularly to systems and methods for backlight assemblies for information displays that include light expanding structures. A backlight assembly may include light expander structures that include a plurality of layer sets, wherein each layer set includes a reflective polarizer layer and a wave retarder layer. The layer sets may together be operative transform point light source, such as a laser light beam, into a surface light source for use as a backlight for various types of information displays.

25 Claims, 12 Drawing Sheets

(56) References Cited

U.S. PATENT DOCUMENTS

| | | | |
|---|---|---|---|
| 2011/0019250 A1* | 1/2011 | Aiki | G02B 5/32 |
| | | | 359/861 |
| 2011/0292321 A1 | 12/2011 | Travis et al. | |
| 2013/0100695 A1 | 4/2013 | Yankov et al. | |
| 2014/0126057 A1 | 5/2014 | Amitai et al. | |
| 2017/0068096 A1* | 3/2017 | Ouderkirk | G02B 13/0055 |
| 2017/0255014 A1 | 9/2017 | Komatsu et al. | |
| 2018/0364409 A1* | 12/2018 | Lee | G02B 6/0031 |
| 2019/0064424 A1 | 2/2019 | Wu et al. | |
| 2020/0192111 A1* | 6/2020 | Ishii | G02B 27/0172 |
| 2020/0371387 A1 | 11/2020 | Gollier et al. | |

OTHER PUBLICATIONS

European Search Report, dated Oct. 30, 2024, for corresponding patent application 22753279.3. (10 pages).

* cited by examiner

DISPLAY BACKLIGHT WITH LIGHT EXPANDER STRUCTURES

BACKGROUND

Technical Field

The disclosure relates generally to backlights for displays and, in at least some implementations, backlights for use in close-eye or head-mounted displays.

Description of the Related Art

A backlit information display, such as a liquid crystal display ("LCD"), comprises several components. Two of those components are the display matrix, which obstructs light on a highly granular sub-pixel basis to create a displayed image, and a light source or backlight. The light source is typically positioned behind the display matrix and illuminates the displayed image. For a color display, the backlight typically emits broad spectrum light, i.e., white light.

Traditionally, the light source used in backlit displays was often one or more cold cathode fluorescent lamps ("CCFLs"). Physically, CCFLs appear somewhat like miniaturized versions of the fluorescent light tubes used in commercial office buildings. However, CCFLs produce light in a different manner than those commercial fluorescent lights. More recently, the use of CCFLs has given way to the use of one or more light emitting diodes ("LEDs") as the light source in information displays. LED technology presently is the most common backlight type for LCD displays.

Backlights may generally be classified into two types, namely, edge-type backlights providing light to a display panel through a side surface of the display panel and direct-type backlights providing light to a display panel through a bottom surface of the display panel. Edge-type backlights have a light source for generating light and a light guide panel or plate for controlling a propagation direction of the light. The light source is placed at a side of the light guide panel, and the light guide panel guides the light, which is transmitted from the light source, to the display panel. According to a shape of light beam generated by the light source, the light source is classified into a point light source, a linear light source and a surface light source, for example.

Close-eye display technology may be used to present information and images to a user as part of a virtual reality ("VR") or augmented reality ("AR") system. Such a close-eye display may be incorporated into a head-mounted display ("HMD") device or headset. HMDs can take many forms including helmets, visors, goggles, masks, glasses, and other head or eye wear. In some embodiments, the virtual reality and augmented reality systems comprise additional components, including a controller or computer that generates image information to drive the virtual reality or augmented reality environment. Such environments may be for a single user or for multiple users. HMDs in virtual reality systems and augmented reality systems can use a single information display or use multiple information displays to present images to a user. While these close-eye information displays can be oriented as direct-view, often the information displays are coupled with one or more lenses in the HMD. Such lenses can enhance the virtual reality or augmented reality experience.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

One or more implementations of the present disclosure are directed to displays for electronic devices, such as head-mounted display devices, laptop computers, tablet computers, televisions, smartphones, wearable computers, computer monitors, etc. Non-limiting examples of electronic devices that may include such displays are shown in FIGS. 1-3.

Liquid crystal displays (LCDs) are a common example of non-emissive displays that require an independent light source, referred to as a backlight unit or assembly. Backlight assemblies provide such displays with homogeneous and bright light with appropriate color characteristics. Backlight technology has become more important recently due to the advent of edge-lit light emitting diode (LED) backlights which have allowed displays to be made much slimmer than previous displays while also reducing power consumption. To meet energy regulations or to satisfy other requirements, it is important for backlight assemblies to be as efficient as possible. As discussed further below, the present disclosure improves the performance of backlight assemblies by providing a backlight assembly that includes beam expander structures that expand a collimated beam of light in multiple dimensions to produce an expanded surface light source that is very efficient relative to existing technology.

Figure 1:
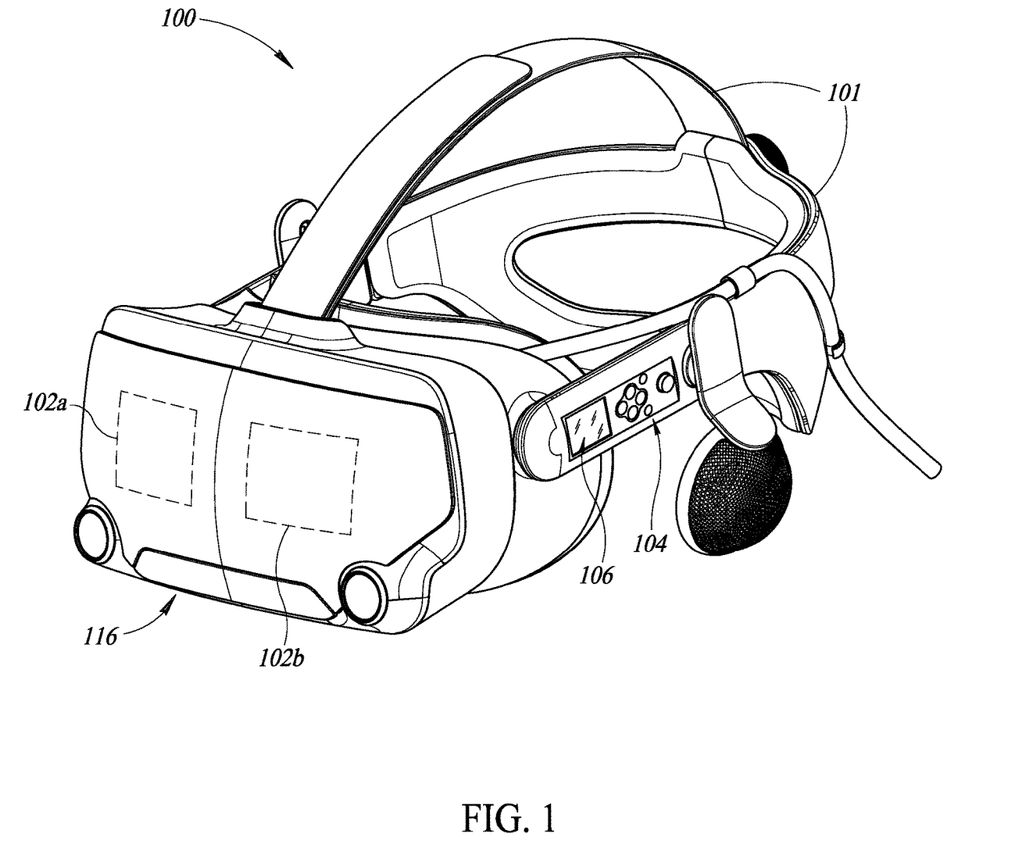
FIG. 1 is an example of a head-mounted display device that includes dual display panels, according to one illustrated implementation.

FIG. 1 illustrates a non-limiting example of an electronic device in the form of a head-mounted display device 100, which may optionally be coupled to a video rendering computing system via a wired or wireless connection to provide a virtual reality display to a human user. In operation, the user wears the HMD device 100 on their head, secured via one or more straps 101, and receives displayed information at each eye via displays 102a and 102b supported by a support structure 116 of the HMD device from the computing system of a simulated environment different from the actual physical environment, with the computing system acting as an image rendering system that supplies images of the simulated environment to the HMD device for display to the user, such as images generated by a game program (not shown) and/or other software program (not shown) executing on the computing system. The user is further able to move around the actual physical environment in this example, and may further have one or more I/O ("input/output") devices to allow the user to further interact with the simulated environment, such as hand-held controllers that are communicatively coupled to the computing system via wired or wireless connections. The HMD device may include one or more user interfaces 104 and 106 that allow the user to provide input to the HMD device 100 or computing system coupled to the HMD device. As the user moves location and/or changes orientation of the HMD device 100, the position of the HMD device may be tracked, such as to allow a corresponding portion of the simulated environment to be displayed to the user on the HMD device, and the controllers may further employ similar techniques to use in tracking the positions of the controllers (and to optionally use that information to assist in determining and/or verifying the position of the HMD device). After the tracked position of the HMD device 100 is known, corresponding information is transmitted to the computing system, which uses the tracked position information to generate one or more next images of the simulated environment to display to the user via the displays 102a and 102b.

Figure 2:
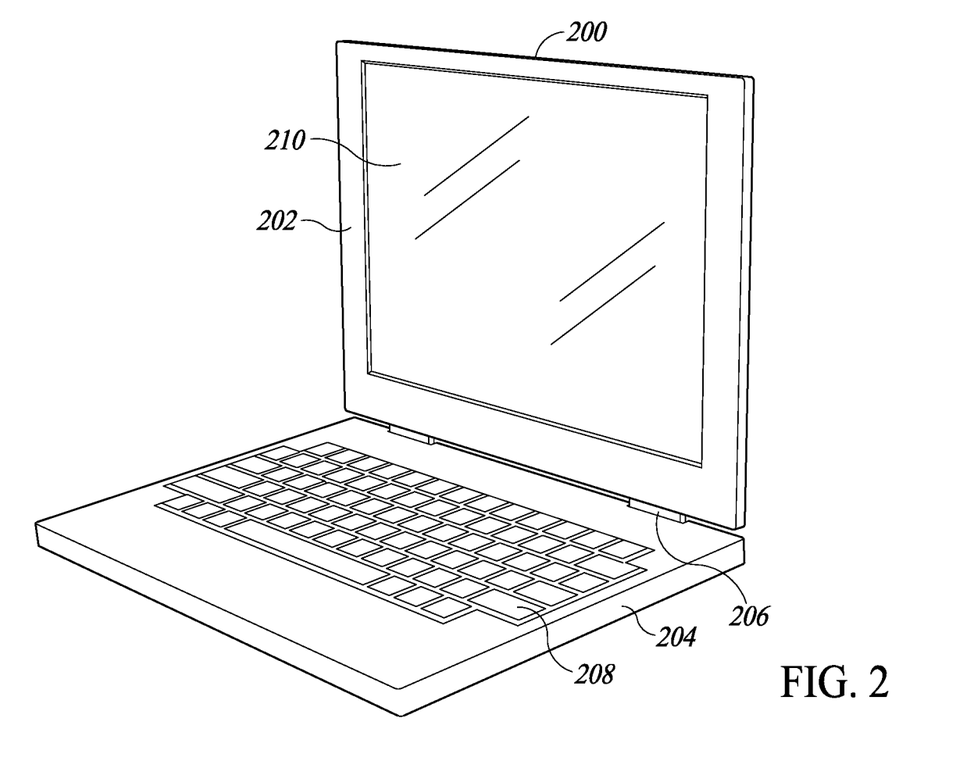
FIG. 2 is an example of a laptop that includes a display panel, according to one illustrated implementation.
Figure 3:
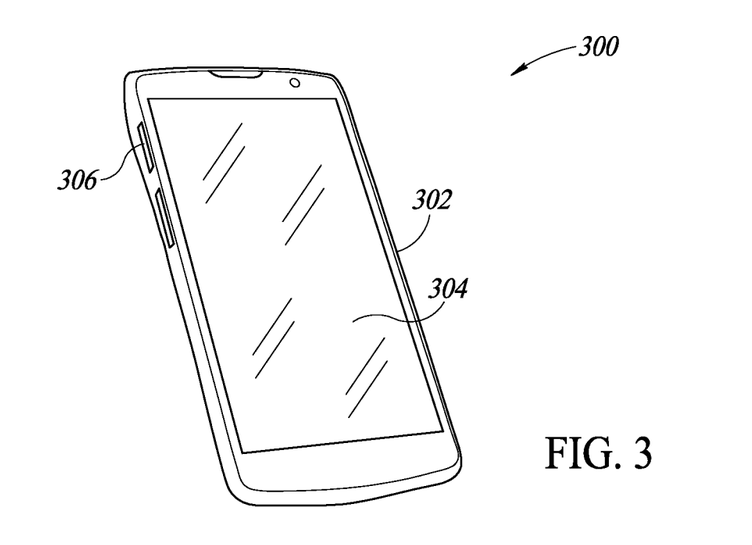
FIG. 3 is an example of a smartphone that includes a display panel, according to one non-limiting illustrated implementation.

FIG. 2 shows an example electronic device in the form of a laptop computer 200 having an upper housing 202 and a lower housing 204 coupled together via hinges 206 that allow the housings to rotate relative to each other. The lower housing 204 includes a keyboard 208 and may include other structures (e.g., touchpad, various ports). The upper housing 202 includes a display panel 210 that may be used to display content to the user.

FIG. 3 shows an example electronic device in the form of a smartphone 300. The smartphone 300 includes a housing 302 that includes a display panel 304 and a plurality of input components 306 (e.g., buttons). In at least some implementations the display panel 304 may be a touchscreen display, for example.

More generally, the displays of the present disclosure may be implemented in any type of electronic device, such as the devices shown in FIGS. 1-3, or other devices including music players, gaming devices, navigation units, vehicle displays, wearable devices, kiosks, or other types of devices that include one or more displays.

Figure 4:
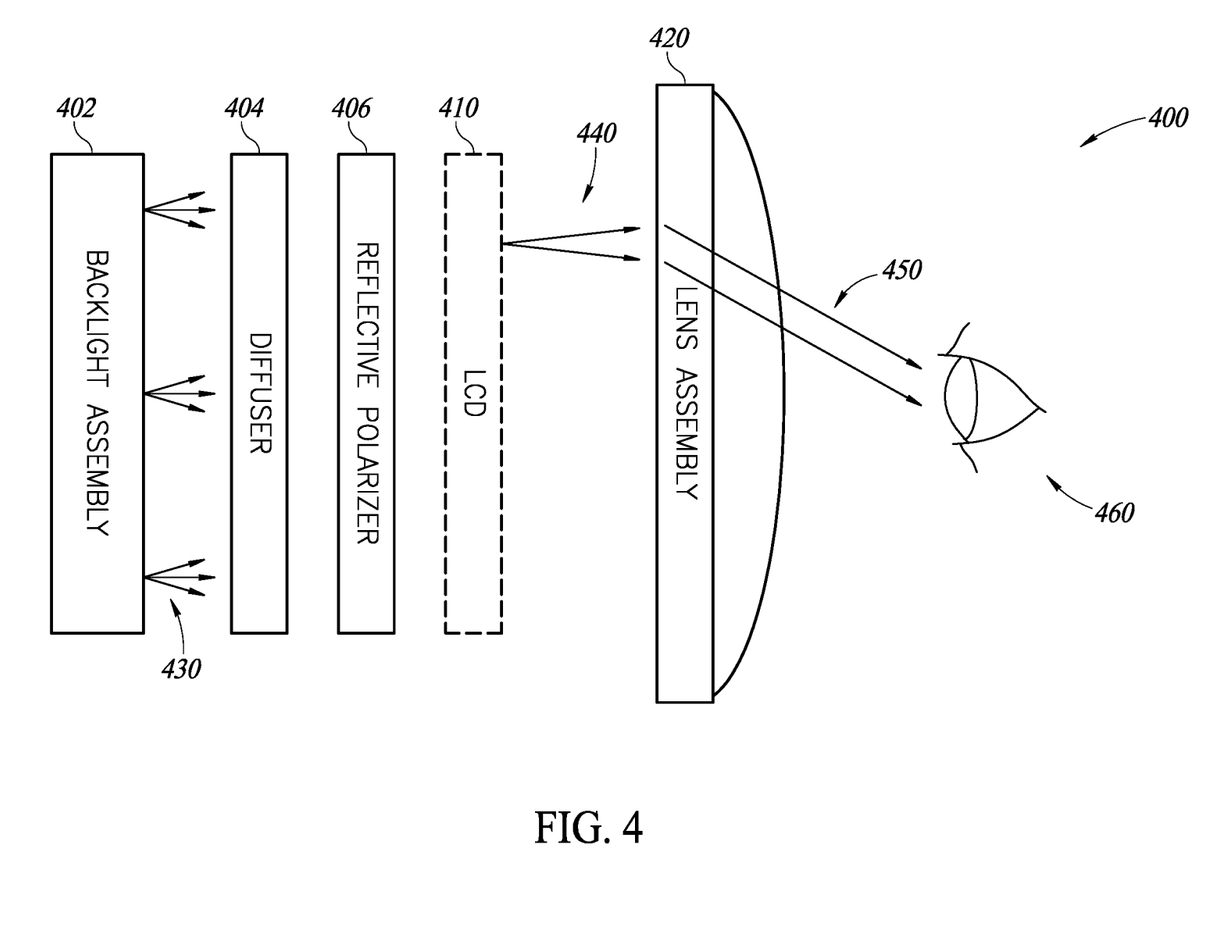
FIG. 4 depicts aspects of an exemplary backlight assembly, according to one non-limiting illustrated implementation.

FIG. 4 depicts an example backlit LCD display 400 with a backlight assembly in a head-mounted display configuration, such as in a virtual reality or augmented reality headset. FIG. 4 shows backlight assembly 402 emitting light 430 that passes through an LCD 410 thereby displaying a visible image. The LCD display may optionally include a diffuser layer 404 to produce more uniform light, and in at least some implementations may optionally include a reflective polarizer layer 406 to recycle light to improve efficiency. Light 440 exiting the LCD 410, then passes through a lens assembly 420, which comprises one or more lenses. In certain embodiments, the lens(es) in the lens assembly 420 may be conventional spherical, aspherical, Fresnel, or any other type of imaging lens. The lens assembly 420 may have lens faces of a single type, or could be combinations of lens types. In some implementations, the lens assembly 420 may have a pancake configuration, which may comprise a polarization-based reflective or refractive optical system. In this case, the lens assembly 420 may comprise an assembly of optical elements configured to direct light from LCD 410 toward a user's eye 460 using on-axis optical folding based, at least in part, on polarization of the light. The lens assembly 420 may include various optical elements other than a lens. For example, the lens assembly 420 may include at least one polarizing beam splitter and a substrate comprising twisted liquid crystal elements. The twisted liquid crystal elements may be configured to modify phase of the light within the lens assembly 420. Light 450 exits the lens assembly 420 directed towards the user's eye 460. In some embodiments, the light 450 creates an eye box of approximately 10 millimeters (e.g., 5-25 mm, etc.). Those of ordinary skill will realize that FIG. 4 is not meant to depict the physical design or layout of an HMD system, but rather the general flow of light among the depicted components in some embodiments.

In certain embodiments, a head-mounted display is designed to be seen by both the left and right eyes of the user. This can be achieved using separate left and right LCD displays, or can be achieved using a single LCD display. Similarly, the virtual reality or augmented reality headset could comprise a single lens assembly or it could use individual left and right lens assemblies.

Figure 5:
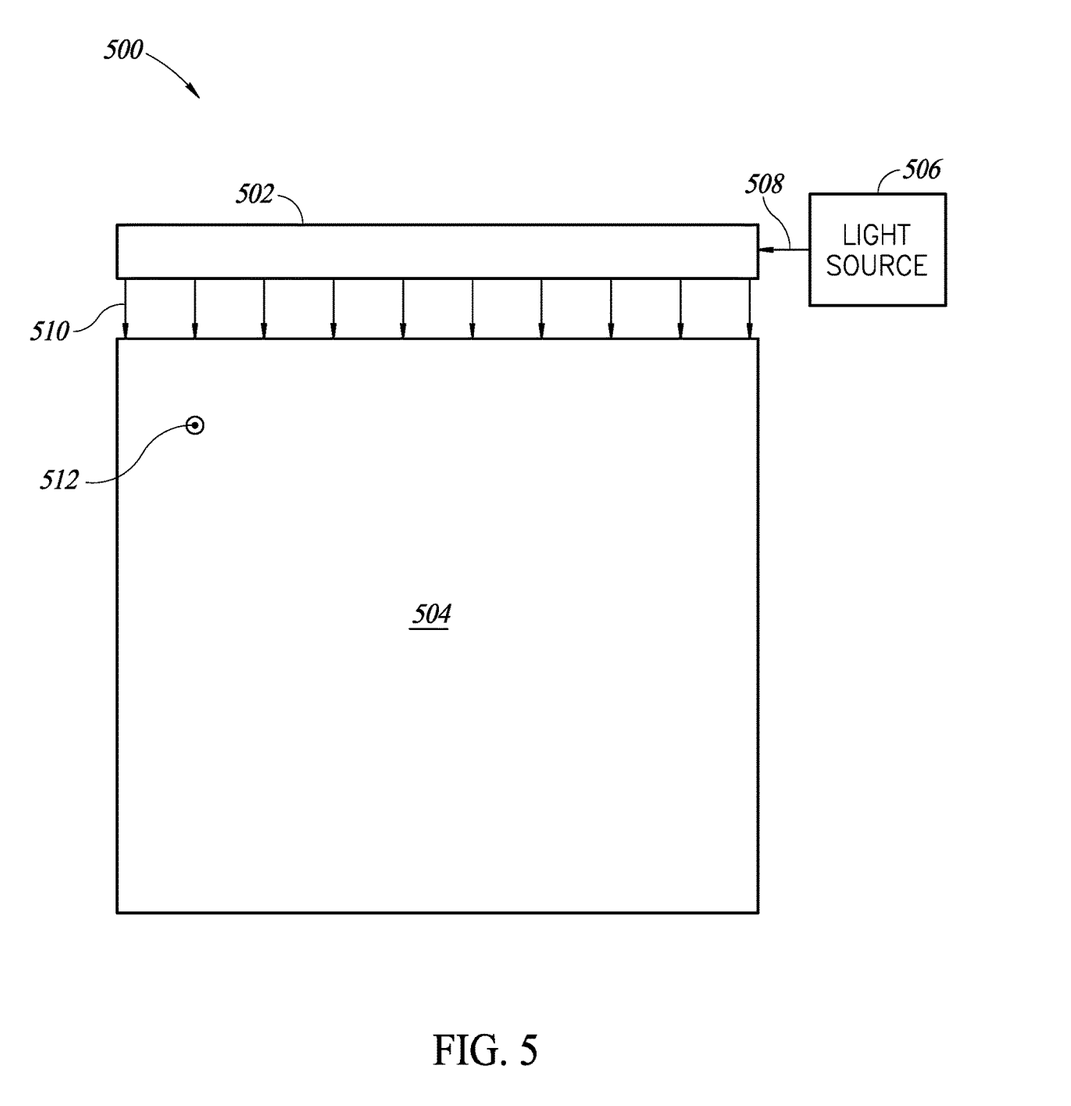
FIG. 5 depicts aspects of a front view of an exemplary backlight assembly, according to one non-limiting illustrated implementation.

FIG. 5 depicts aspects of a front view of an exemplary backlight assembly 500 according to certain embodiments of the present disclosure. The backlight assembly 500 may include a first light expander structure 502 that is elongated and a second light expander structure 504 that is rectangular-shaped (e.g., square). The second light expander structure may have a length and width that are approximately the same as the length and width of the display of which the backlight assembly is a part. The first light expander structure 502 may receive incoming light 508 from a light source 506 (e.g., one or more laser light sources), and may redirect the incoming light 508 towards the second light expander structure 504. In this configuration, incoming light 508 is received at an edge of the first light expander structure 502 and is output from a planar face of the first light expander structure as redirected light 510. The redirected light 510 may then be received at an edge of the second light expander structure 504, and the second light expander structure may redirect the light 510 upward (as shown, out of the page) as light 512 toward a pixelated display panel (e.g., towards the LCD 410 of FIG. 4). Accordingly, emitted light 512 is output from a planar face of the second light expander structure 504. This light 512 is thereby emitted from the backlight assembly 500. In some embodiments, the light 512 may pass through additional components before the light is received at the pixelated display panel.

Figure 6:
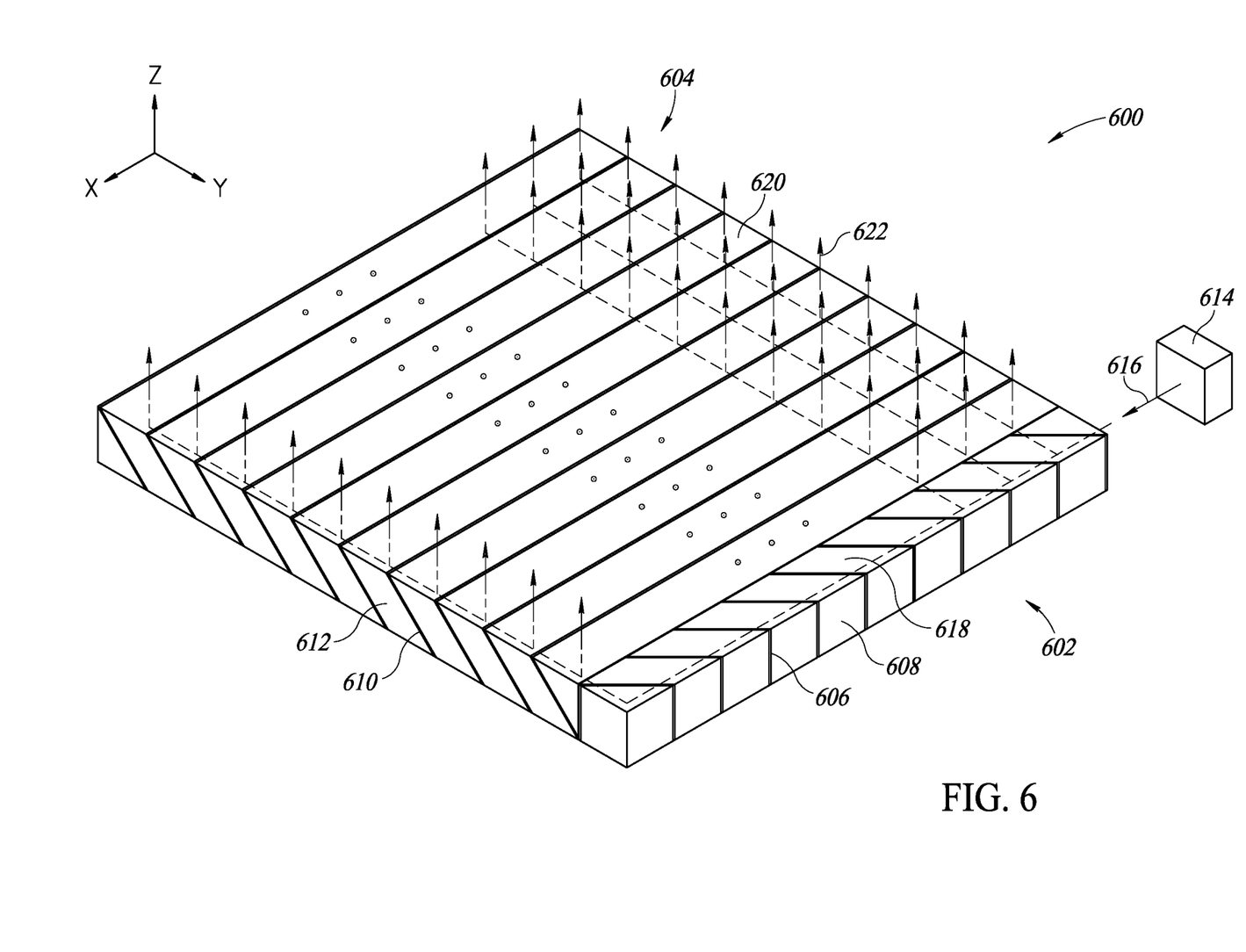
FIG. 6 is a perspective view of a backlight assembly, according to one non-limiting illustrated implementation.

FIG. 6 shows a perspective view of an example light-guide panel assembly 600 for a backlight assembly according to one or more implementations of the present disclosure. Various other views of the light-guide panel assembly 600 are shown in FIGS. 7-10. The light-guide panel assembly 600 may be a component in any of various types of displays, such as the displays discussed herein.

The light-guide panel assembly 600 includes a first light expander structure 602 and a second light expander structure 604. The first and second light expander structures 602 and 604 may be similar or identical to the first and second light expander structures 502 and 504, respectively. The first and second light expander structures 602 and 604 may be coupled together by a suitable optically clear adhesive (OCA). The first light expander structure 602 may comprise a strip-like elongated waveguide arranged adjacent to and parallel with an edge of the second light expander structure 604. The first light expander structure 602 is operative to receive and redirect light 616 radiated from a light source 614 in the longitudinal ('x') direction of the first light expander structure 602. The light source 614 may be one or more laser light sources (e.g., red, green, and blue semiconductor lasers) that emits a polarized beam 616 of light having particular dimensions (e.g., 1-5 mm×1-5 mm square, Gaussian, etc.). The light source 614 may comprise multiple laser sources that each emit light having a different color (e.g., red, green, blue). The light source 614 may emit coherent light having linear polarization of a first polarization state (e.g., horizontal polarization). The light source 614 may comprise one or more other light sources and optional lenses that provide collimated light to the light expander structure 602.

Figure 7:
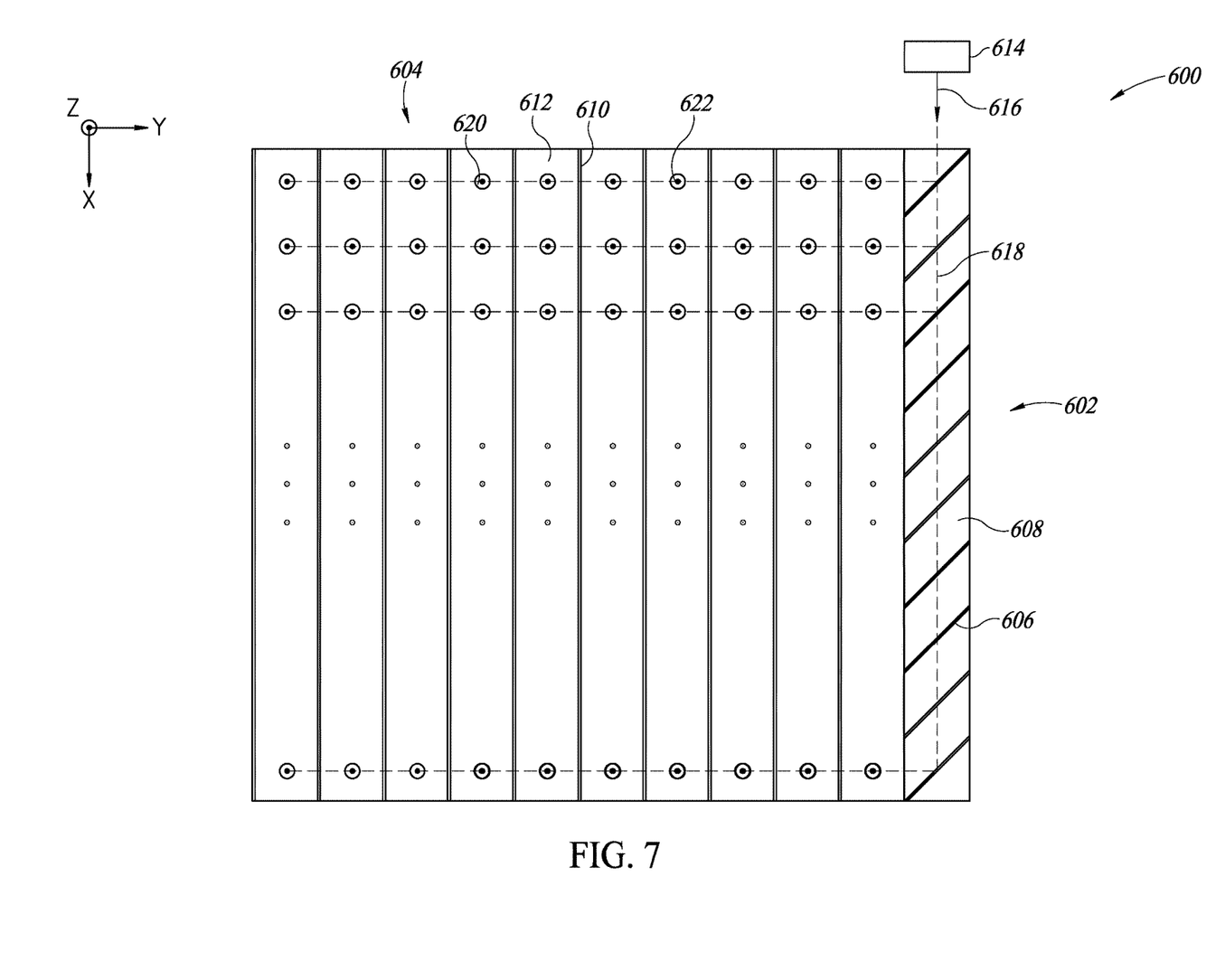
FIG. 7 is a top view of the backlight assembly of FIG. 6, according to one non-limiting illustrated implementation.
Figure 8:
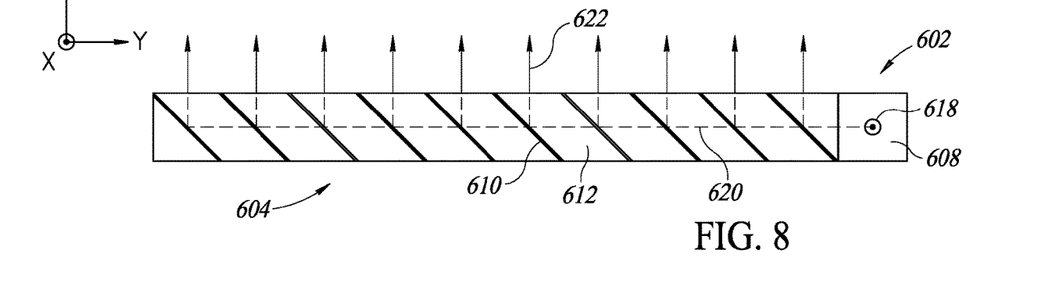
FIG. 8 is an elevational view of the backlight assembly of FIG. 6, according to one non-limiting illustrated implementation.
Figure 10:
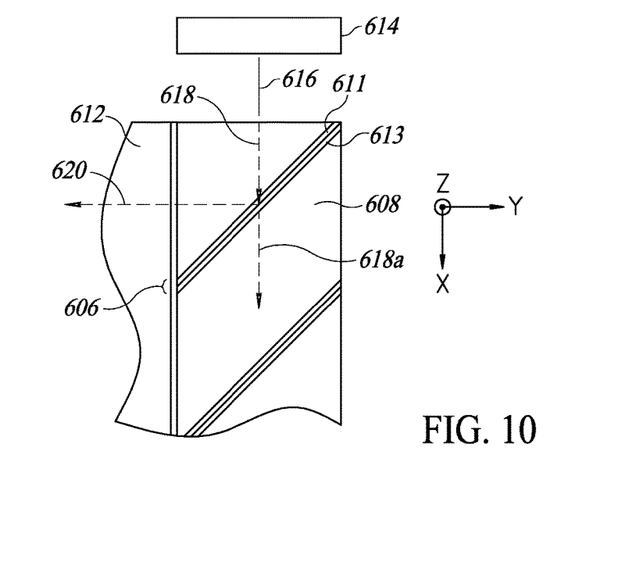
FIG. 10 is an enlarged view of a portion of a first light expander structure of the backlight assembly of FIG. 6, according to one non-limiting illustrated implementation.

As shown in FIGS. 7 and 10, the first light expander structure 602 may include a first plurality of layer sets (e.g., 3 to 50 layer sets), wherein each layer set includes a substrate 608 (e.g., plastic) and layers 608 that comprise a reflective polarizer layer 611 and a wave retarder layer 613. The reflective polarizer layer 611 and the wave retarder layer 613 are oriented at a 45 degree angle with respect to the light 616 received from the light source 614, and which passes through the first light expander structure (designated as light 618 within the structure 602).

Each of the reflective polarizer layers 611 may be configured to reflect linearly polarized light having a second polarization state (e.g., vertical polarization) that is orthogonal to the polarized light emitted by the light source 614. The reflective polarizer layers 611 may comprise a polarizer film (e.g., DBEF), a wire grid polarizer (WGP), or any other suitable reflective polarizer operative to achieve the functionality discussed herein.

Since the reflective polarizer layers 611 not ideal reflective polarizers, they do not simply reflect 100% of the light that is vertically polarized and transmit 100% of the light that is not vertically polarized. Rather, even for pure horizontally polarized light, the reflective polarizer layers 611 reflect a small percentage (e.g., 5-15 percent) of the light and pass the remaining light (e.g., 85-95 percent).

The wave retarder layers 613 are configured to shift the polarization orientation of the light by a determined amount of rotation (e.g., 5-20 degrees). Each of the wave retarder layers 613 may be a half-wave plate, a quarter-wave plate, or any other suitable wave retarder that is operative to shift or rotate the polarization orientation of light by a determined amount. The wave retarder layers 613 may each shift the polarization orientation by the same amount, or different wave retarder layers may shift the polarization orientation by varying amounts. As a non-limiting example, a first set of wave retarder layers 613 may provide a rotation shift of 10 degrees, a second set of wave retarder layers may provide a shift of 15 degrees, and a third set of wave retarder layers may provide a shift of 20 degrees. The number of retarder layers in each set may the same or may be different.

Figure 9:
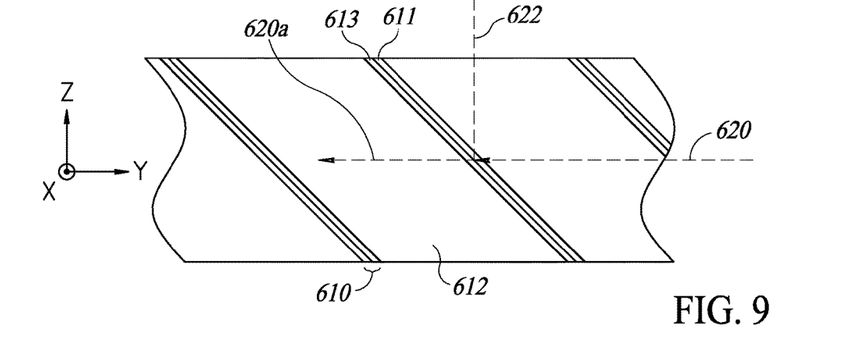
FIG. 9 is an enlarged view of a portion of a second light expander structure of the backlight assembly of FIG. 6, according to one non-limiting illustrated implementation.

As shown in FIGS. 7 and 9, the second light expander structure 604 may include a second plurality of layer sets (e.g., 3 to 50 layer sets, or more), wherein each layer set includes a substrate 612 (e.g., acrylic or other plastic) and layers 610 that comprise a reflective polarizer layer 611 and a wave retarder layer 613. The reflective polarizer layer 611 and the wave retarder layers 613 are oriented at a 45 degree angle with respect to the light 620 received from the first light expander structure 602, as discussed further below.

In operation, according to one non-limiting example, a collimated beam of horizontally polarized light 616 from the light source 614 enters an edge of the first light expander structure 602. When light 618 reaches each reflective polarizer 611 and following wave retarder layer 613, a small fraction (e.g., 5-15 percent) of the light (designated by arrow 620) is reflected in the 'y' direction toward the second light expander structure 604 and the remaining portion (e.g., 85-95 percent) is rotated by the following wave retarder layer 613 to produce light 618a (FIG. 10) that is rotated by a determined amount (e.g., 10 degrees, 15 degrees, 20 degrees). Thus, as the light 618 travels in the 'x' direction along the first light expander structure 602, fractions of the light are directed toward the second light expander structure 604 along the 'x' direction of the second light expander structure by each reflective polarizer 611 of the first light expander structure 602.

The operation of the second light expander structure 604 is similar. Light 620 traveling in the 'y' direction from the first light expander structure 602 is received by the second light expander structure 604 at intervals determined by the location of the reflective polarizer layers 611 of the first light expander structure 602. When the light 620 reaches each reflective polarizer 611 and following wave retarder layer 613 of the second light expander structure 604, a small fraction (e.g., 5-15 percent) of the light (designated by arrow 622) is reflected in the 'z' direction toward the display module (not shown in FIG. 6) and the remaining portion (e.g., 85-95 percent) is rotated by the following wave retarder layer 613 to produce light 620a (FIG. 9) that is rotated by a determined amount (e.g., 10 degrees, 15 degrees, 20 degrees). Thus, as the light 620 travels in the 'y' direction along the second light expander structure 602, fractions of the light are directed upward (as shown) toward the display module along the 'z' direction of the second light expander structure 604. Since the light 620 from the first light expander structure 602 is distributed along the 'x' dimension of the second light expander structure 604, the light 622 emitted by the second light expander structure 604 provides substantially uniform surface illumination in the 'z' direction for a display module.

The number of reflective polarizer layers, the number of wave retarder layers, and the amount of rotation provided by each wave retarder layer may be designed to provide uniform light throughout the area of the second light expanding structure 604. Further, although not shown, various components may have one or more additional reflective layers positioned adjacent one or more edges recycle light, which may improve the efficiency.

Figure 11:
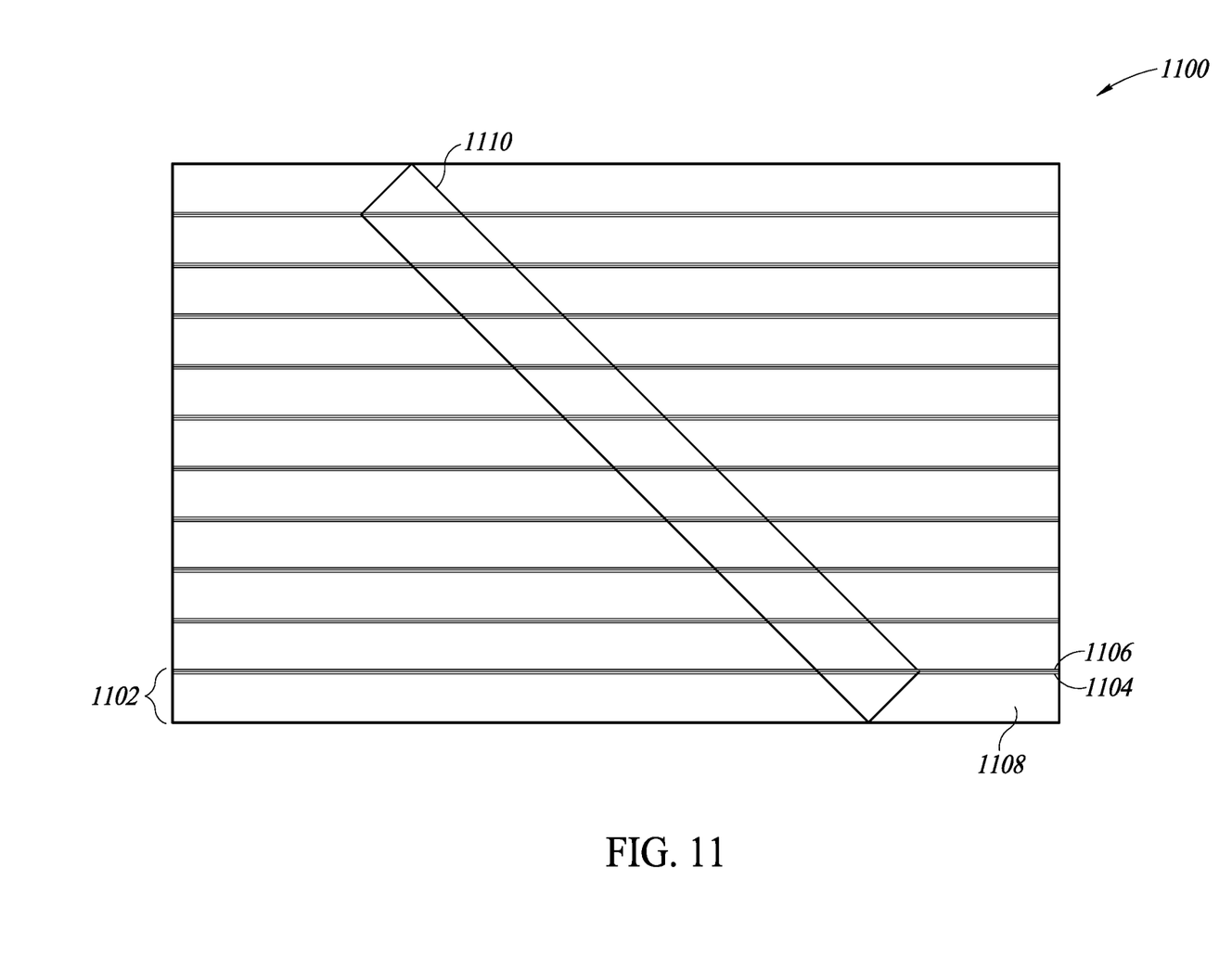
FIG. 11 is an elevational view of a stack comprising a plurality of layer sets used to form a backlight assembly, according to one non-limiting illustrated implementation.
Figure 12:
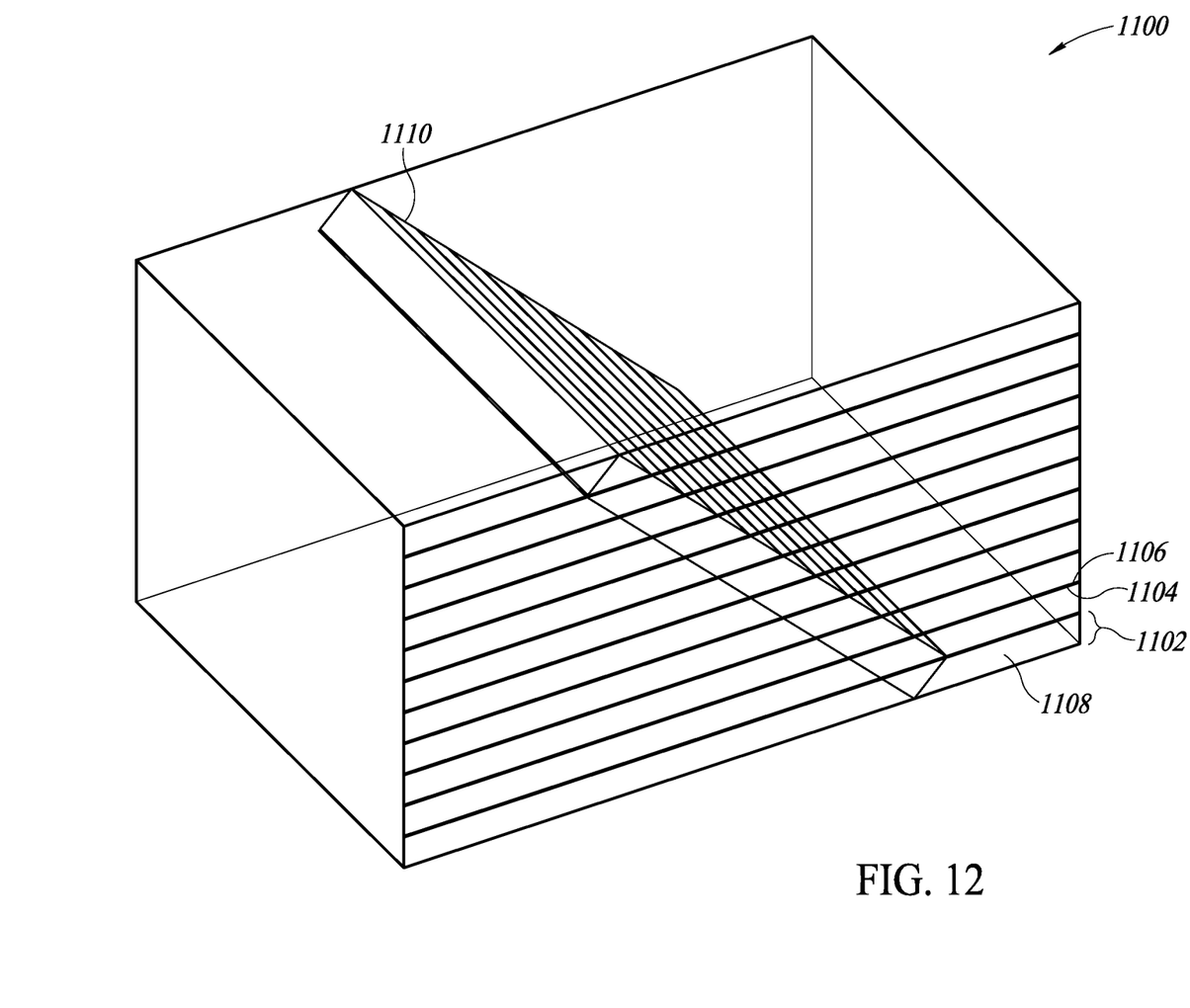
FIG. 12 is a perspective view of the stack comprising a plurality of layer sets of FIG. 11, according to one non-limiting illustrated implementation.
Figure 13A:
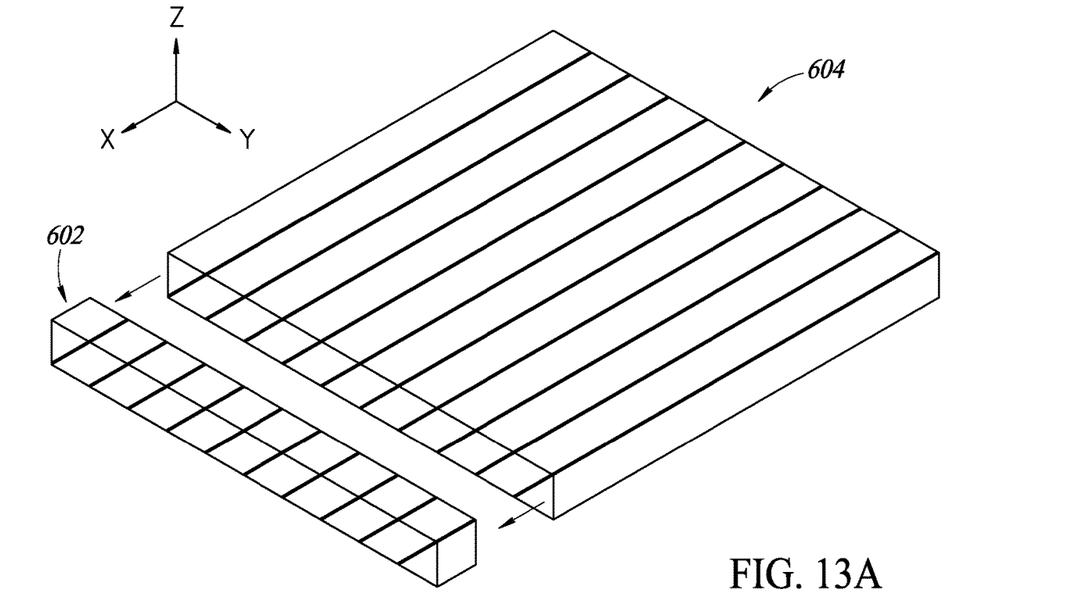
FIGS. 13A-13C illustrate example steps for manufacturing a backlight assembly comprising a first light expander structure and a second light expander structure formed from a stack comprising a plurality of layer sets, according to one non-limiting illustrated implementation.
Figure 13B:
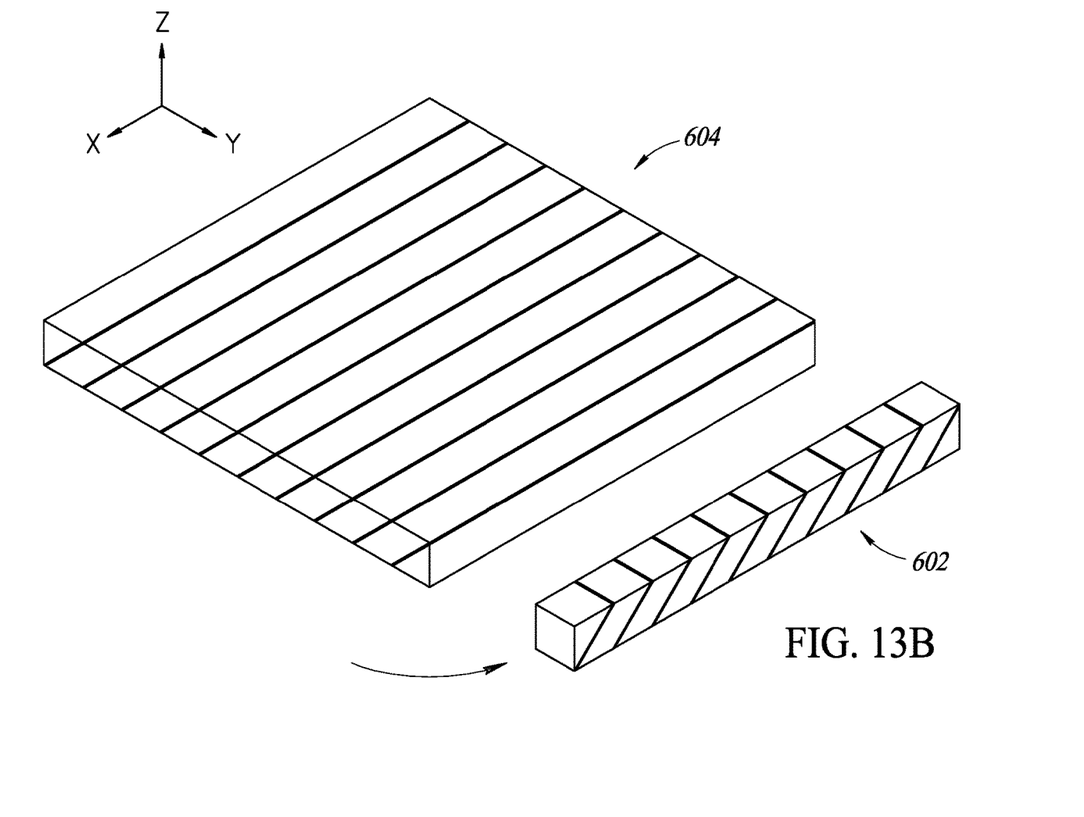
Figure 13C:
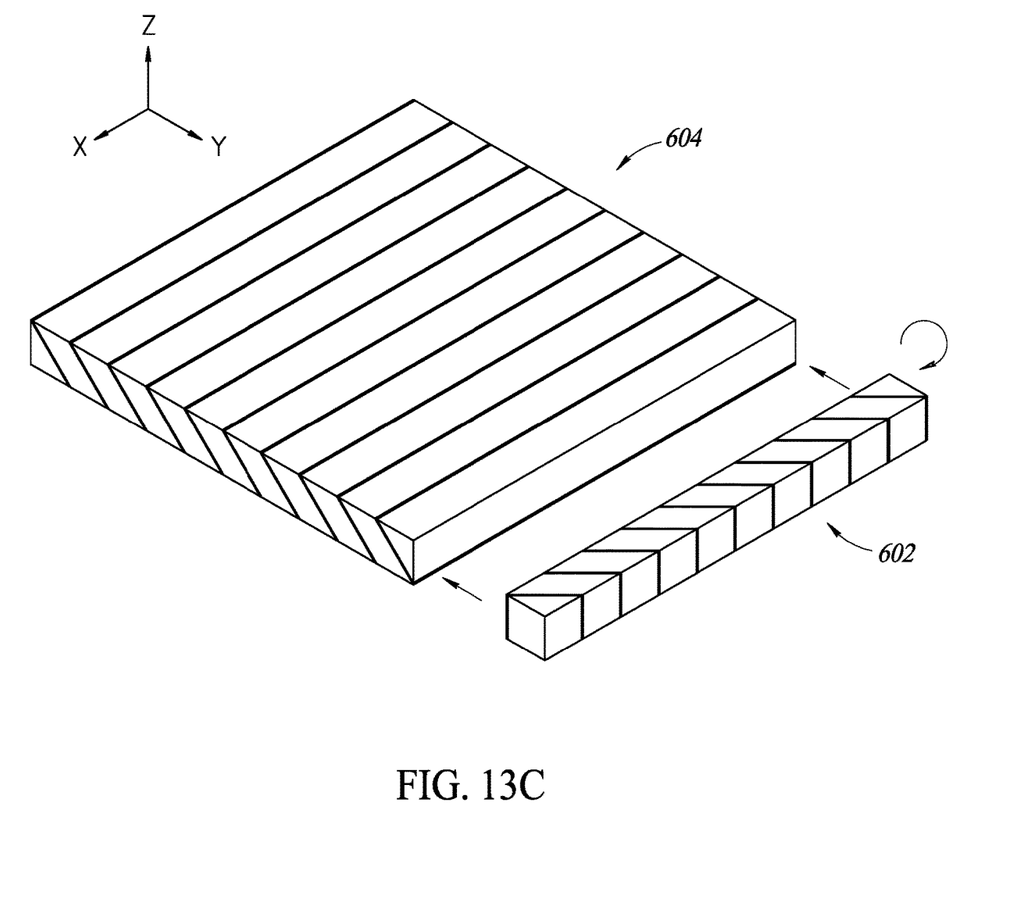

FIGS. 11-13 show a non-limiting example for a method of manufacturing a light-guide panel assembly, such as the light-guide panel assembly 600 shown in FIGS. 6-10.

Initially, a set 1100 of a plurality of stacked layer sets 1102 may be formed. Each of the plurality of stacked layer sets may include a substrate layer 1108 (e.g., acrylic or other plastic), a wave retarder layer 1104, and reflective polarizer layer 1106. Although 10 layer sets 1102 are shown in this example embodiment, it should be appreciated that the number of stacked layer sets may be selected based on the particular application. For example, there may be 3 layer sets, 5 layer sets, 10 layer sets, 20 layer sets, 25 layer sets, 50 layer sets, 100 layer sets, etc.

An intermediate light-guide panel assembly 1110 may then be formed by cutting through the plurality of stacked layer sets at a 45 degree angle, as shown in FIGS. 11 and 12. It is noted that, in FIG. 12, the layer sets 1102 are only shown on one edge of the stack 1100 for clarity.

FIGS. 13A-C show various steps of a method of manufacturing the first light expander structure 602 and second light expander structure 604 from the intermediate light-guide panel assembly 1110 shown in FIGS. 11 and 12.

As shown in FIG. 13A, a portion of the intermediate light-guide panel assembly 1110 may be cut to form the first light expander structure 602 and the second light expander structure 604. As shown FIG. 13B, the first light expander structure 602 may be rotated about the 'z' axis and moved with respect to the second light expander structure 604 to be proximate the bottom-right edge (as shown) of the second light expander structure. As shown in FIG. 13C, the first light expander structure 602 may also be rotated clockwise (as shown) about the 'x' axis, and coupled (e.g., via an OCA) to the second light expander structure 602 to form the light-guide panel assembly 600 discussed herein.

Figure 14:
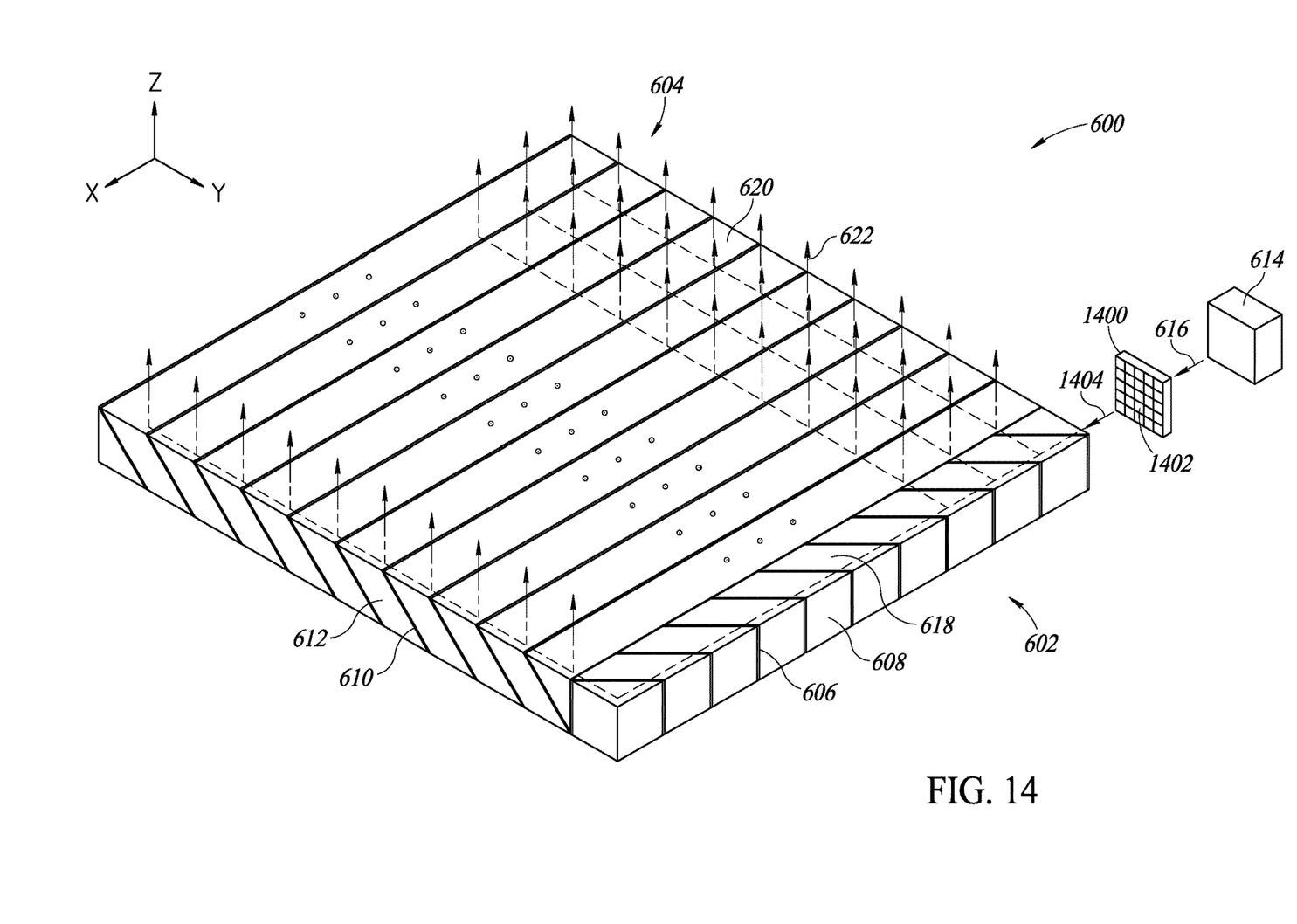
FIG. 14 is a perspective view of a backlight assembly that includes an optical component that homogenizes light from a light source prior to entering a light expander of the backlight assembly, according to one non-limiting illustrated implementation.

FIG. 14 is a perspective view of the backlight assembly 600 also shown in FIG. 6 that includes an optical component 1400 that homogenizes light from the light source 614 prior to entering the first light expander structure 602 of the backlight assembly. The optical component 1400 may include a microlens array (as shown) that comprises a plurality of microlenses 1402 (e.g., a 5×5 array, a 10×10 array, etc.). In at least some implementations, the optical component 1400 may additionally or alternatively include a diffuser, another type of optical component, or a combination of two or more components operative to homogenize the light 616 emitted by the light source 614 to provide homogenized light 1404 to the first light expander structure 602 of the backlight assembly 600.

The microlens array 1400 may be useful for homogenizing a variety of modern light sources 614, including laser diodes, high power LEDs, etc. The microlens array 1400 may advantageously provide high efficiency and non-Gaussian uniformity for the light.

The microlens array 1400 may be used for beam homogenization and shaping, to change the light from the light source 614 from a Gaussian pattern to a spot pattern or a square "flat-top" pattern. Thus, when the light is expanded as discussed herein, the light is substantially more uniform than would be the case if the light remained in the Gaussian pattern. As an non-limiting example, the microlens array 1400 may include a plurality of square microlenses. Further, as noted above, the optical component 1400 may include one component or a plurality of optical components (e.g., microlens array and a second lens, microlens array and a diffuser, etc) to provide homogenized light to the light expander structures 602 and 604 of the backlight assembly 600.

Those of skill in the art will recognize that many of the methods or algorithms set out herein may employ additional acts, may omit some acts, and/or may execute acts in a different order than specified. The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A display device, comprising:
a display module; and
a backlight assembly which provides light to the display module, the backlight assembly comprising:
a light source; and
light-guide panel assembly, the light-guide panel assembly comprising:
a first light expander structure that is positioned to receive light from the light source, the first light expander structure comprising a first plurality of layer sets, each of the first plurality of layer sets comprising a reflective polarizer layer and a wave retarder layer; and
a second light expander structure that is positioned adjacent the first light expander structure to receive light therefrom and to emit light toward the display module, the second light expander structure comprising a second plurality of layer sets, each of the second plurality of layer sets comprising a reflective polarizer layer and a wave retarder layer, wherein each wave retarder of the first and second plurality of layer sets is configured to shift the polarization orientation of light by a determined amount of rotation that is between 5 degrees and 20 degrees, inclusive.

2. The display device of claim 1 wherein the light source emits a coherent beam of light that is linearly polarized in a first polarization state, and the reflective polarizer layers in the first plurality of layer sets are configured to reflect light that is linearly polarized in a second polarization state, the second polarization state orthogonal to the first polarization state.

3. The display device of claim 1 wherein each of the wave retarder layers of the first plurality of layer sets and the second plurality of layer sets comprises half-wave plate.

4. The display device of claim 1 wherein at least one of the wave retarder layers of the first plurality of layer sets and the second plurality of layer sets shifts the polarization direction of light by an amount that is different from the amount of shift provided by at least one other of the wave retarder layers of the first plurality of layer sets and the second plurality of layer sets.

5. The display device of claim 1 wherein each of the reflective polarizer layers and each of the wave retarder layers are oriented at an angle of 45 degrees with respect to light incident upon the reflective polarizer layers and the wave retarder layers.

6. The display device of claim 1 wherein each layer set of the first plurality of layer sets and the second plurality of layer sets comprises layer of transparent plastic.

7. The display device of claim 1 wherein the each of the first plurality of layer sets and the second plurality of layer sets comprises 3 to 50 layer sets.

8. The display device of claim 1 wherein each of the reflective polarizer layers comprises at least one of a reflective polarizer film or a wire grid polarizer.

9. The display device of claim 1 wherein each of the wave retarder layers of the first plurality of layer sets and the second plurality of layer sets comprises quarter-wave plate.

10. The display device of claim 1 wherein the light source emits light in a first direction, the first light expander structure is operative to direct light received from the light source in a second direction orthogonal to the first direction, and the second light expander structure is operative to direct light received from the first light expander structure in a third direction orthogonal to the first direction and the second direction.

11. The display device of claim 1 wherein the first light expander structure is coupled to the second light expander structure by an optically clear adhesive.

12. The display device of claim 1, further comprising a diffuser layer positioned between the backlight assembly and the display module.

13. The display device of claim 1 wherein the light source comprises a plurality of lasers that each emit light of a different color.

14. The display device of claim 1, wherein the light source comprises at least one of:
a laser that produces coherent light; or
a collimating lens assembly.

15. The display device of claim 1, further comprising:
a lens array positioned between the light source and the light-guide panel assembly to homogenize the light emitted by the light source prior to entering the first light expander structure of the light-guide panel assembly.

16. The display device of claim 1, further comprising:
a diffuser positioned between the light source and the light-guide panel assembly to homogenize the light emitted by the light source prior to entering the first light expander structure of the light-guide panel assembly.

17. A light-guide panel assembly, comprising:
a first light expander structure that is positioned to receive light from a light source, the first light expander structure comprising a first plurality of layer sets, each of the first plurality of layer sets comprising a reflective polarizer layer and a wave retarder layer; and
a second light expander structure that is positioned adjacent the first light expander structure to receive light therefrom and to emit light toward a display module, the second light expander structure comprising a second plurality of layer sets, each of the second plurality of layer sets comprising a reflective polarizer layer and a wave retarder layer
wherein each wave retarder of the first and second plurality of layer sets is configured to shift the polarization orientation of light by a determined amount of rotation that is between 5 degrees and 20 degrees, inclusive.

18. The light-guide panel assembly of claim 17, wherein the reflective polarizer layers in the first plurality of layer sets are configured to reflect light that is linearly polarized in a polarization state that is orthogonal to the polarization state of light emitted by the light source.

19. The light-guide panel assembly of claim 17 wherein each of the wave retarder layers of the first plurality of layer sets and the second plurality of layer sets comprises one of a half-wave plate or a quarter-wave plate.

20. The light-guide panel assembly of claim 17 wherein at least one of the wave retarder layers of the first plurality of layer sets and the second plurality of layer sets shifts the polarization direction of light by an amount that is different from the amount of shift provided by at least one other of the wave retarder layers of the first plurality of layer sets and the second plurality of layer sets.

21. The light-guide panel assembly of claim 17 wherein each of the reflective polarizer layers and each of the wave retarder layers are oriented at an angle of 45 degrees with respect to light incident upon the reflective polarizer layers and the wave retarder layers.

22. The light-guide panel assembly of claim 17 wherein the each of the first plurality of layer sets and the second plurality of layer sets comprises 3 to 50 layer sets.

23. The light-guide panel assembly of claim 17 wherein the first light expander structure is operative to receive light from the light source in a first direction and to direct the received light in a second direction orthogonal to the first direction, and the second light expander structure is operative to direct light received from the first light expander structure in a third direction orthogonal to the first direction and the second direction.

24. The light-guide panel assembly of claim 17 wherein the first light expander structure is coupled to the second light expander structure by an optically clear adhesive.

25. A method of manufacturing a light-guide panel assembly, comprising:
forming plurality of stacked layer sets, each of the plurality of stacked layer sets comprising a reflective polarizer layer, a wave retarder layer, and a plastic layer;

cutting through the plurality of stacked layer sets at a 45 degree angle to generate intermediate light-guide panel assembly;

cutting a portion of the intermediate light-guide panel assembly to form a first light expander structure and a second light expander structure;

rotating the first light expander structure with respect to the second light expander structure; and coupling the rotated first light expander structure to the second light expander structure to form the light-guide panel assembly.

* * * * *